April 22, 1941.   J. B. POWERS   2,238,916
MIXING VALVE
Filed May 23, 1940   2 Sheets-Sheet 1
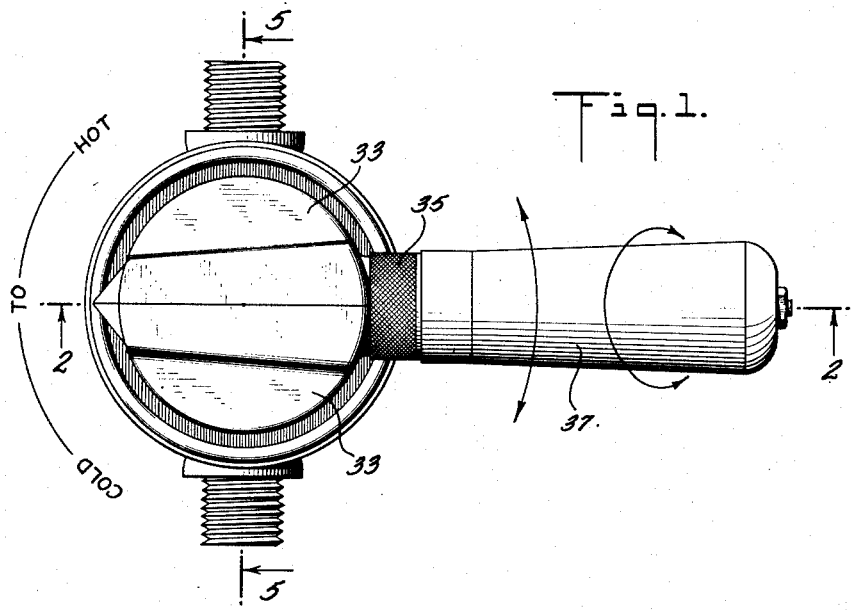
Fig. 1.
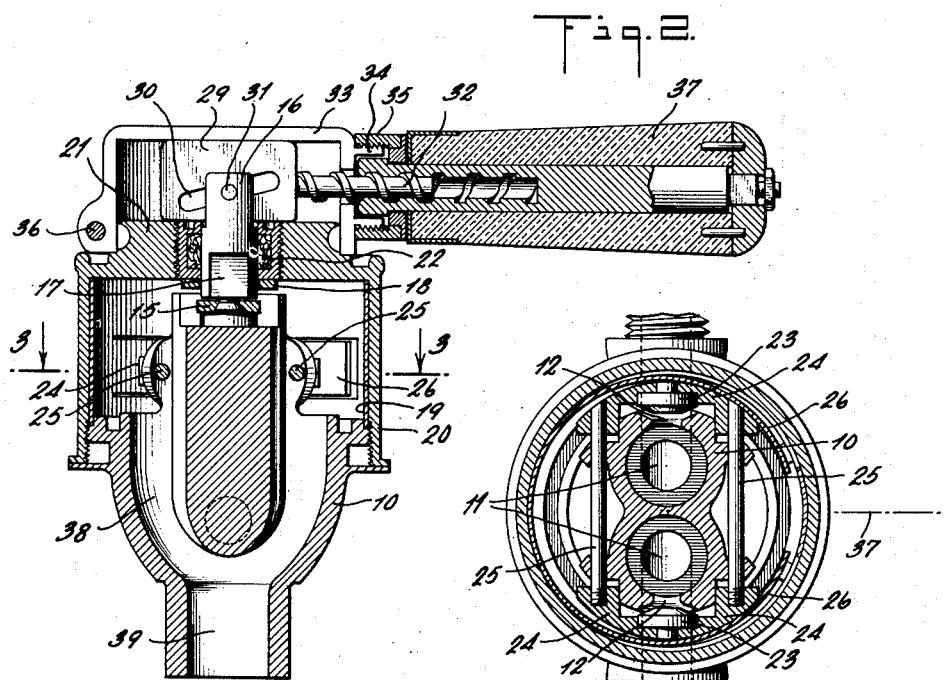
Fig. 2.
Fig. 3.
INVENTOR
Joseph Blair Powers
BY
Kenyon & Kenyon
ATTORNEYS

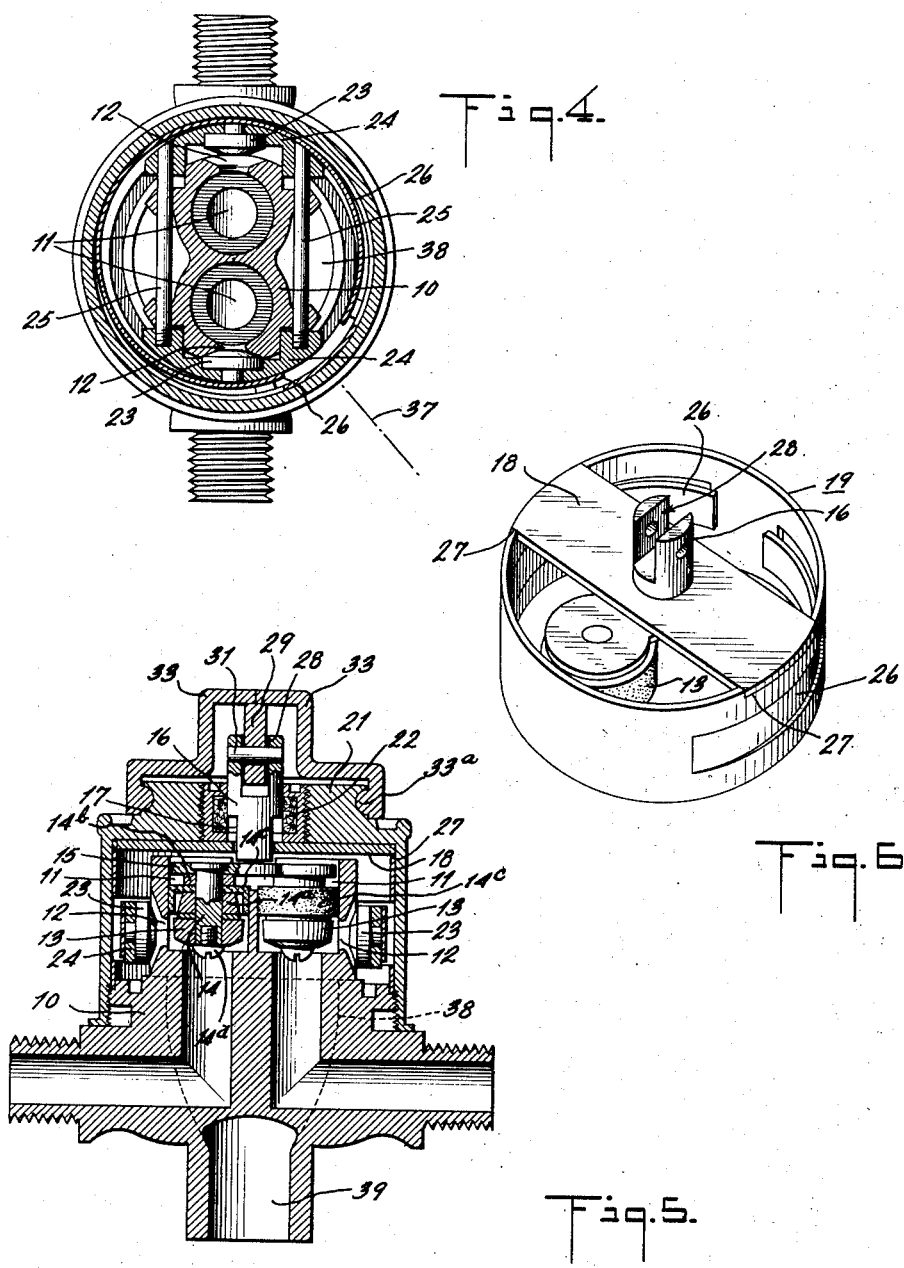

Patented Apr. 22, 1941

2,238,916

UNITED STATES PATENT OFFICE 2,238,916

MIXING VALVE

Joseph Blair Powers, Jackson Heights, N. Y.

Application May 23, 1940, Serial No. 336,687

13 Claims. (Cl. 277—18)

This invention relates to mixing valves for use in connection with hot and cold water supply pipes to deliver water at desired temperature and flow rate. Previous valves of this type have not been capable of regulating bodily the flow rate and the temperature by operation of a single handle.

An object of this invention is a valve of the type above referred to of such construction that both the flow rate and temperature are controllable by operation of a single handle.

In a preferred embodiment of the invention, the valve comprises a generally cylindrical block containing a pair of passageways having lateral ports. A valve is provided in each passageway and means, later to be referred to, are provided for effecting simultaneous corresponding operation of said valve. A valve is provided for each lateral port and said valves are interconnected by a rigid frame capable of reciprocation with the arrangement being such that when one valve closes its associated port, the remaining valve is in such position that its associated port is fully open. A rotatable member is supported by the block and is provided with eccentric surfaces for engagement with said frame to effect reciprocation thereof upon rotation of said member. A handle is connected to said rotatable member for bodily movement therewith as well as for rotation about an internal axis and means are provided for effecting operation of said passageway valves by rotation of the handle. One passageway is connected to the cold water supply pipe while the other passageway is connected to the hot water supply pipe and in operation of the valve, the handle is rotated about its axis to vary the rate of flow by controlling the position of the passageway valves. Also, the handle is bodily moved to rotate said member on said block to vary the ratio of flow of hot and cold water, thus controlling the temperature.

Other objects, novel features and advantages of this invention will become apparent from the following specification and accompanying drawings, wherein:

Fig. 1 is a plan view of a valve embodying the invention;

Fig. 2 is a section on the line 2—2 of Fig. 1;

Fig. 3 is a section on the line 3—3 of Fig. 2;

Fig. 4 is a view similar to Fig. 3 with the parts in different position;

Fig. 5 is a section on the line 5—5 of Fig. 1, and

Fig. 6 is a perspective view of the rotatable member which operates the temperature controlling valves.

The valve comprises a cast metal body portion having a generally cylindrical block 10 containing two passageways 11, one of which communicates at one end with the cold water inlet and the other of which communicates at one end with the hot water inlet. The block is provided with a pair of ports 12, one of which communicates with one passageway 11 and the other of which communicates with the remaining passageway 11. A valve 13 is provided in each passageway 11 for movement longitudinally thereof to control the inlet to such passageway, thereby limiting the permissible rate of flow either of hot or cold water. The valves 13 are rigidly connected to a cross bar 15 which in turn is rotatably attached to a stud 16. The stud 16 has a substantially rectangular portion 17 which is received in a similar shaped aperture in the plate 18 so that the stud is capable of axial movement relative to the plate but is incapable of rotary movement relative thereto. A cylinder 19 encloses the block 11 and is rotatable relative thereto. A casing 20 encloses the cylinder 19 and is threaded to the body portion. A cylindrical extension 21 is provided on the casing and has an annular groove. The stud 16 extends through a stuffing box 22 provided in the extension 21 with a fluid-tight seal therebetween. A valve 23 for each port 12 is carried by a cross head 24 and the two cross heads are interconnected by rods 25 to form a frame. The rods 25 are slidably supported by the block 11 so that the frame is capable of reciprocation and the distance between the valves 23 is such that when one valve is fully seated, the other valve is fully unseated. The cylinder 19 is provided with two eccentric surfaces 26 which may be formed in any desired manner, but preferably are formed by inwardly offsetting portions of the cylinder. The eccentric surfaces 26 are adapted to engage the arcuate surfaces of the cross heads 24 to effect reciprocation of the frame upon rotation of the cylinder. In the edge of the cylinder 19 are provided a pair of notches 27 in which are received the ends of the plate 18 thereby locking the latter to the former for unitary rotation. The projecting end of the stud 16 is provided with a notch 28 in which is received the slide 29 having an oblique slot 30. A pin 31 passes through the slot 30 and its ends are received in the stud 16, thereby interconnecting the slide and stud in such manner that reciprocation of the slide effects axial movement of the stud with consequent simultaneous corresponding operation of the valves 13. A feed screw 32 extends from one end of the slide 29. A two-section cap 33 fits over the projection 21 and has annular ribs 33a fitting into the annular groove of the projection 21. The cap 33 has an offset portion into which extends the slide 29 and a threaded boss 34 of which one-half is integral with one cap section. The cap is held assembled by a sleeve 35 threaded on to the boss 34 and a screw 36 located diametrically opposite the boss. A handle 37 is rotatably attached to the sleeve 35 and receives the feed screw 32, the arrangement being such that rotation of the handle effects reciprocation of the feed screw together with the slide 29.

Also in the body portion are provided outlet passageways 38 which communicate with a common discharge port 39. Water supplied to the interior of the housing formed by the body portion and the casing 20 escapes through the passageways 38 and port 39.

In the operation of the valve above described, the rate of flow is controlled by varying the position of the valves 13 by rotation of the handle 37. Such rotation causes reciprocation of the slide 29 with consequent corresponding change of position of the valves 23. Rotation of the handle 37 effects merely change of flow rate without in any way changing the temperature. In order to change the temperature, the handle 37 is moved bodily to effect rotation of the cylinder 19, thereby causing reciprocation of the inlet but opposite movement of the valves 23 with corresponding change in the ratio of hot and cold water. Such operation of the valves 23, however, has no effect on the double flow rate, but merely varies the ratio of the hot and cold water.

In Figs. 1, 2, 3 and 5, both inlet ports are shown as being 50% open and the valves 23 are shown as set for 50% hot water and 50% cold water. With this arrangement, the handle 37 is in midposition. Movement of the handle 37 either way from the position shown in Fig. 1 causes one valve 23 to move toward fully unseated position while the other valve is moved toward fully seated position and in Fig. 4 is illustrated the arrangement in which the cold water valve 23 is fully seated and the hot water valve 23 is fully unseated. Movement of the handle 37 to its opposite extreme position will effect reverse setting of the valves 23.

Each valve 13 is mounted on a stud 14 connected at one end to the cross-bar 15. Also, on each stud 14 is a fibre washer 14a and a fibre washer 14b between which is arranged a flexible cup washer 14c. The entire assembly is held on the stud 14 by a bolt 14d. The rim of the cup washer 14c is turned toward the valve 13 and effectively seals the passageway 11 against the escape of water therethrough except by way of the port 12.

I claim:

1. A mixing valve comprising a block containing a pair of inlet passageways, a first and a second valve for each passageway for controlling flow therethrough, a rotatable member, a handle connected to said rotatable member for bodily movement therewith and for rotation about an internal axis, means operated by rotation of said handle to effect simultaneous equal similar movement of both said first valves, and means operated by said rotatable member for effecting simultaneous equal and opposite movement of both said second valves.

2. A mixing valve comprising a block containing a pair of inlet passageways, a handle supported for bodily swinging movement and for rotation about an internal axis, means operated by rotation of said handle for simultaneously varying the permissible flow of rate through each passageway with corresponding variation in combined permissible flow rate through the two passageways, and additional means operated by swinging movement of said handle for simultaneously varying the actual flow rate through each passageway while maintaining constant the combined actual flow rate through said two passageways.

3. A mixing valve comprising a block containing a pair of inlet passageways, a valve for each passageway, additional means including a rotatable member for simultaneously varying the actual flow rate through each passageway while maintaining constant the combined flow rate through said two passageways, a handle connected to said rotatable member for bodily movement therewith and for rotation about an internal axis, and means operated by rotation of said handle to effect simultaneous corresponding operation of said two valves.

4. A mixing valve comprising a block containing a pair of inlet passageways of which each has a lateral port and a valve seat, a valve for each seat, a rotatable cylinder surrounding said block, a valve for each port, interconnections between said cylinder and said port valves for effecting movement of the latter upon rotation of the former while maintaining constant the combined flow rate through said ports, a handle connected to said rotatable member for bodily movement therewith and for rotation about an internal axis, and means operated by rotation of said handle to effect simultaneous corresponding operation of said two passageway valves.

5. A mixing valve comprising a block containing a pair of inlet passageways of which each has a lateral port and a valve seat, a valve for each seat, a rotatable cylinder surrounding said block, a valve for each port, a frame rigidly interconnecting said port valves and slidably supported by said block, eccentric surfaces on said cylinder engageable with said frame for effecting reciprocation thereof upon rotation of said cylinder, a handle connected to said cylinder for bodily movement therewith and for rotation about an internal axis, and means operated by rotation of said handle to effect simultaneous corresponding operation of said two passageway valves.

6. A mixing valve comprising a block containing a pair of inlet passageways of which each has a lateral port and a valve seat, a valve for each seat, a rotatable cylinder surrounding said block, a stud rotatably connected to said passageway valves and connected to said cylinder for reciprocation relative thereto only, a valve for each lateral port, interconnections between said cylinder and port valves for effecting movement of the latter upon rotation of the former while maintaining constant the combined flow rate through said ports, a handle connected to said cylinder for bodily movement therewith and for rotation about an internal axis, a slide operated by rotation of said handle at right angles to the direction of movement of said stud, and a pin and slot connection between said slide and stud for effecting reciprocation of said stud upon reciprocation of said slide.

7. A mixing valve comprising a block containing a pair of inlet passageways of which each has a lateral port and a valve seat, a valve for each seat, a rotatable cylinder surrounding said block, a valve for each port, a frame rigidly interconnecting said port valves and slidably supported by said block, eccentric surfaces on said cylinder engageable with said frame for effecting reciprocation thereof upon rotation of said sleeve, a handle connected to said cylinder for bodily movement therewith and for rotation about an internal axis, a stud rotatably connected to said passageway valves, means connecting said stud to said cylinder for axial reciprocation relative thereto only, a slide, means operated by rotation of said handle to effect rotation of said slide, and a pin and slot connection between said stud and slide for effecting reciprocation of said stud upon reciprocation of said slide.

8. A mixing valve comprising a block containing a pair of inlet passageways of which each has a lateral port and a valve seat, a valve for each seat, a rotatable cylinder surrounding said block, a stud rotatably connected to said passageway valves and connected to said cylinder for reciprocation relative thereto only, a valve for each lateral port, interconnections between said cylinder and port valves for effecting movement of the latter upon rotation of the former while maintaining constant the combined flow rate through said ports, a handle connected to said cylinder for bodily movement therewith and for rotation about an internal axis, a slide operated by rotation of said handle at right angles to the direction of movement of said stud, and interconnections between said slide and stud for effecting reciprocation of the former upon reciprocation of the latter.

9. A mixing valve comprising a block containing a pair of inlet passageways of which each has a lateral port and a valve seat, a valve for each seat, a rotatable cylinder surrounding said block, a valve for each port, a frame rigidly interconnecting said port valves and slidably supported by said block, eccentric surfaces on said cylinder engageable with said frame for effecting reciprocation thereof upon rotation of said cylinder, a handle connected to said cylinder for bodily movement therewith and for rotation about an internal axis, a stud rotatably connected to said passageway valves, means connecting said stud to said cylinder for axial reciprocation relative thereto only, a slide, means operated by rotation of said handle to effect rotation of said slide, and interconnections between said slide and stud for effecting reciprocation of the former upon reciprocation of the latter.

10. A mixing valve comprising a block containing a pair of inlet passageways of which each has a lateral port and a valve seat, a first valve for each lateral port and a second valve for each seat, a rotatable cylinder surrounding said block, interconnections between said cylinder and said port valves for effecting movement of the latter upon rotation of the former while maintaining constant the combined flow rate through said ports, a casing enclosing said cylinder and having a projection with an annular groove, a two-section cap surrounding said projection and having an annular rib seated in the projection groove, a stud extending through said projection and pivotally connected to said second valves, interconnecting means between said stud and cylinder for effecting combined rotary motion but permitting relative axial motion, a handle supported by said cap for rotation about an axis internal of the handle, a slide in said cap, interconnecting means between said slide and handle for effecting reciprocation of said slide at right angles to said stud upon rotation of said handle, and a pin and slot connection between said slide and stud for effecting reciprocation of one upon reciprocation of the other.

11. A mixing valve comprising a block containing a pair of inlet passageways of which each has a lateral port and a valve seat, a first valve for each lateral port and a second valve for each seat, a rotatable cylinder surrounding said block, interconnections between said cylinder and said port valves for effecting movement of the latter upon rotation of the former while maintaining constant the combined flow rate through said ports, a casing enclosing said cylinder and having a projection with an annular groove, a two-section cap surrounding said projection and having an annular rib seated in the projection groove, a stud extending through said projection and pivotally connected to said second valves, interconnecting means between said stud and sleeve for effecting combined rotary motion but permitting relative axial motion, a handle supported by said cap for rotation about an axis internal of the handle, a slide in said cap, interconnecting means between said slide and handle for effecting reciprocation of said slide at right angles to said stud upon rotation of said handle and interconnections between said slide and stud for effecting reciprocation of the former upon reciprocation of the latter.

12. A mixing valve comprising a block containing a pair of inlet passageways of which each has a lateral port and a valve seat, a valve for each seat, a rotatable cylinder surrounding said block, a valve for each port, a frame rigidly interconnecting said port valves and slidably supported by said block, eccentric surfaces on said cylinder engageable with said frame for effecting reciprocation thereof upon rotation of said sleeve, a handle connected to said cylinder for bodily movement therewith and for rotation about an internal axis, a stud rotatably connected to said passageway valves, a plate slidably connected to said stud and having its ends interconnected with said cylinder, a slide, interconnections between said slide and handle for effecting reciprocation of said slide at right angles to said stud upon rotation of said handle, and interconnections between said slide and stud for effecting reciprocation of one upon reciprocation of the other.

13. A mixing valve comprising a block containing a pair of inlet passageways of which each has a lateral port and a valve seat, a first valve for each lateral port and a second valve for each seat, a rotatable cylinder surrounding said block, interconnections between said cylinder and said port valves for effecting movement of the latter upon rotation of the former while maintaining constant the combined flow rate through said ports, a casing enclosing said cylinder and having a projection with an annular groove, a two-section cap surrounding said projection and having a threaded boss equally divided between the two sections and an annular rib seated in the projection groove, a collar threaded on to said boss, a handle supported by said collar for rotation about an internal axis, a stud extending through said projection and pivotally connected to said second valves, a slide in said cap, interconnections between said slide and handle for effecting reciprocation of said slide at right angles to said stud upon rotation of said handle, inter-connections between said stud and cylinder for effecting combined rotary motion while permitting relative axial motion, and interconnections between said slide and said stud for effecting reciprocation of one upon reciprocation of the other.

JOSEPH BLAIR POWERS.